(12) United States Patent
Oka et al.

(10) Patent No.: US 7,166,246 B2
(45) Date of Patent: Jan. 23, 2007

(54) SCREW BACKPRESSURE CONTROLLING METHOD IN ELECTRIC INJECTION MOLDING MACHINE

(75) Inventors: Keijiro Oka, Aichi-ken (JP); Yasuhiro Yabuki, Aichi-ken (JP)

(73) Assignee: Kabushiki Kaisha Meiki Seisakusho, Aichi-Ken (JP)

( * ) Notice: Subject to any disclaimer, the term of this patent is extended or adjusted under 35 U.S.C. 154(b) by 385 days.

(21) Appl. No.: 10/752,710

(22) Filed: Jan. 8, 2004

(65) Prior Publication Data

US 2004/0159965 A1    Aug. 19, 2004

(30) Foreign Application Priority Data

Feb. 13, 2003   (JP)   ............... 2003-034695

(51) Int. Cl.
*B29C 45/77* (2006.01)
*B29C 45/48* (2006.01)

(52) U.S. Cl. .................. 264/40.1; 264/328.1

(58) Field of Classification Search ............... 264/40.1, 264/40.5, 328.1
See application file for complete search history.

(56) References Cited

U.S. PATENT DOCUMENTS 6,365,075 B1 *   4/2002   Kamiguchi et al. ........ 264/40.3
6,368,095 B1 *   4/2002   Chang ........................ 425/145

FOREIGN PATENT DOCUMENTS

JP   2000-318003   *  11/2000
JP   2003-334848   *  11/2003

OTHER PUBLICATIONS

Patent Abstracts of Japan, "JP 61-031221 published Feb. 13, 1986, applicant Nissei Plastics IND Co, entitled: Control of Backpressure in injection Molding Machine".
Patent Abstracts of Japan, "JP 04-249129 published Sep. 4, 1992, applicant FANCU Ltd, entitled: Injection, Dwell Pressure and Back Pressure Control Method for Motorized Injection Molding Machine".
Patent Abstracts of Japan, "JP 02-120020 published May 8, 1990, applicant FANCU Ltd, entitled: Back Pressure Control Method And Device In Motor-Driven Injection Molding Machine".

* cited by examiner

*Primary Examiner*—Jill L. Heitbrink
(74) *Attorney, Agent, or Firm*—Browdy and Neimark, PLLC

(57) ABSTRACT

The electric injection molding machine comprises a sensor 21, servo motor 15, a motor 23 and a controller 30 and, in a plasticizing process in which the motor 23 is rotated, the controller 30 performs control by repeating a first process in which the rotation of the servo motor 15 is controlled by a first retreating speed command value 33 to make the screw 13 retreat at a low speed when a screw backpressure signal is smaller than a backpressure set value 31 and a second process in which the rotation of the servo motor 15 is controlled by a second retreating speed command value 34 to make the screw 13 retreat at a high speed when the screw backpressure signal is larger than the backpressure set value 31.

9 Claims, 8 Drawing Sheets

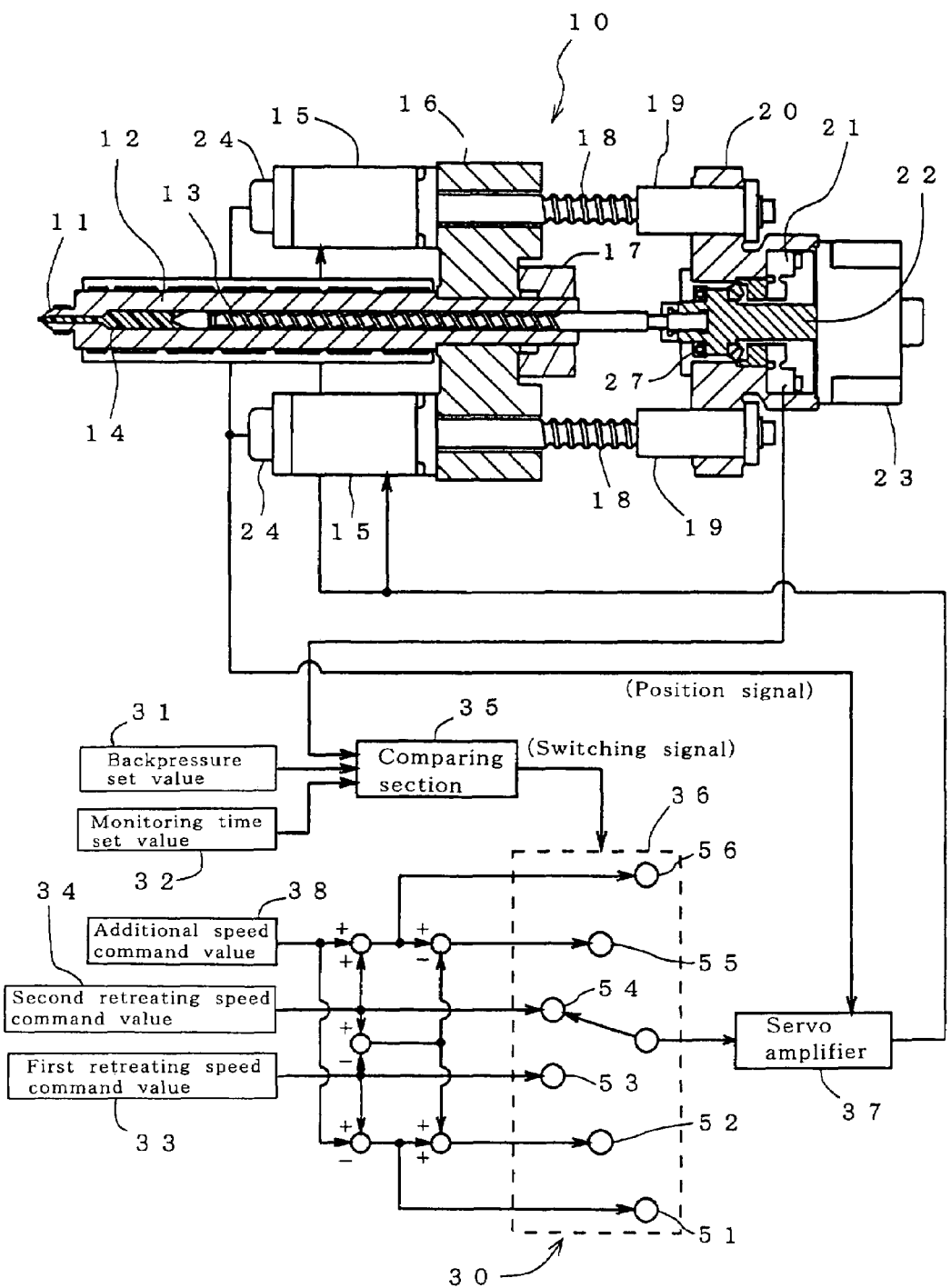
F I G. 1

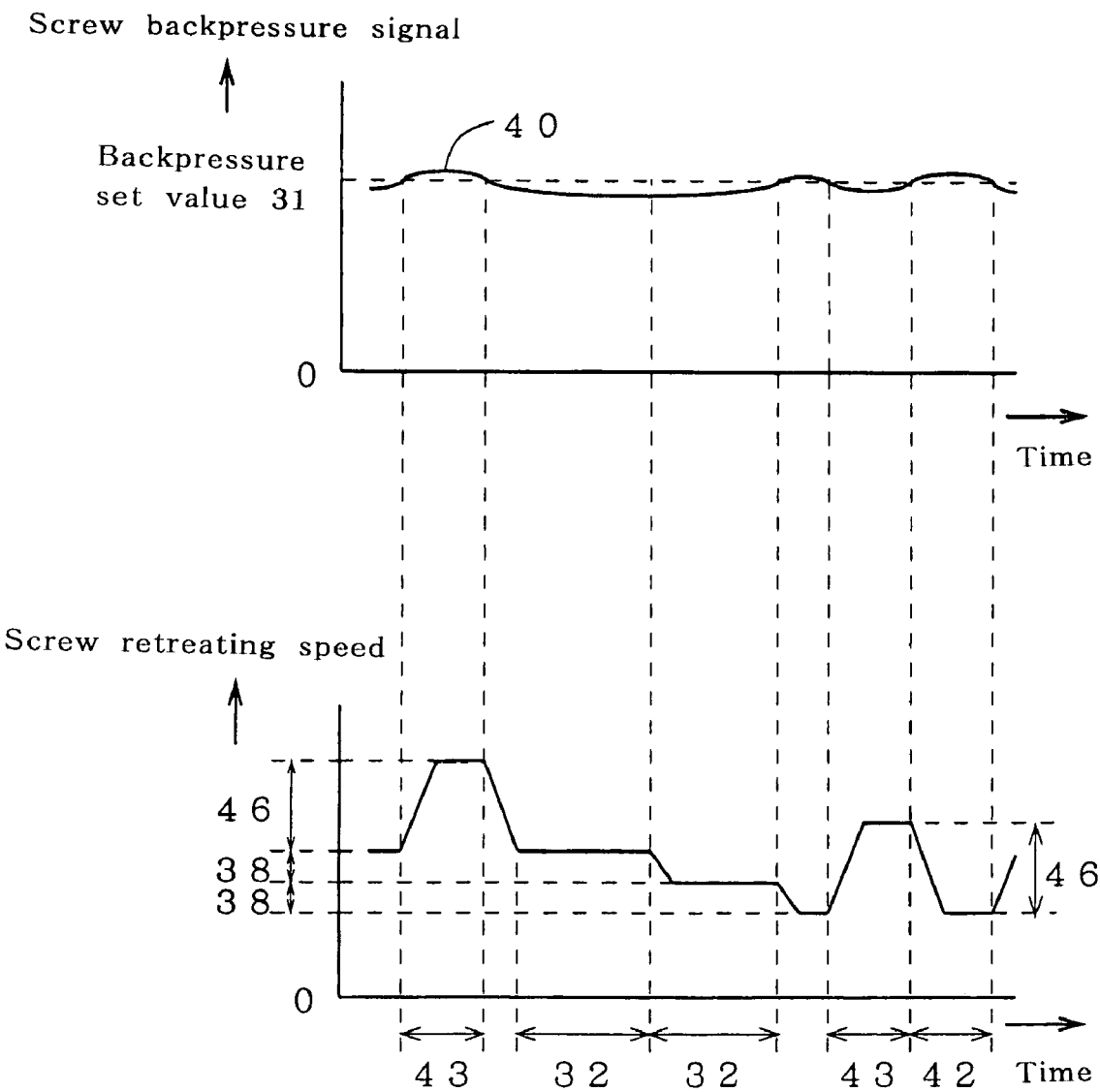
F I G. 3

SCREW BACKPRESSURE CONTROLLING METHOD IN ELECTRIC INJECTION MOLDING MACHINE

BACKGROUND OF THE INVENTION

1. Field of the Invention

The present invention relates to a screw backpressure controlling method in a plasticizing process of an electric injection molding machine.

2. Description of the Related Art

In a conventional screw backpressure controlling method, a linear movement of a screw that retreats due to a melted resin pressure generated by plasticization is converted into a rotary movement and, then, a rotary force and a rotation frequency of a servomotor rotated by the rotary movement is controlled. The rotary force may be controlled by feedback controlling the servo motor so that the screw backpressure obtained by measuring the melted material pressure or the screw retreating force electrically conforms to a set value of the screw backpressure (for example, see Japanese Unexamined Patent Publication (Kokai) No.61-31221). Further, the rotation frequency may be feedback controlled so that the backpressure conforms to a set pressure by detecting a pressure applied to the resin, determining a difference between a set backpressure and the detected pressure, and outputting a movement command based on said difference between the set backpressure and the detected pressure to a servo circuit that drives and controls the servo motor (for example, see Japanese Unexamined Patent Publication (Kokai) No.04-249129).

In yet another technique, a moving speed of the screw is feedback controlled so that the detected resin pressure is equal to the set backpressure, wherein a speed setting command value for a servo motor is varied according to an override value to allow the screw to move backward continuously and smoothly (for example, Japanese Unexamined Patent Publication (Kokai) No.02-120020).

However, because all of the conventional screw backpressure controlling method described in the above Japanese Unexamined Patent Publications are based on feedback control, it is inevitably needed to set constants such as a proportional gain P, an integral gain I and a derivative gain D. In order to improve control accuracy, these PID constants are desired to be set as high as possible. However, the injection molding is applied to a great many types of resin materials, flowability and melting properties of which vary in a wide range. Therefore, if the PID constants are set on the assumption of an average resin material, there will be problems in that the gain is too low to ensure the control accuracy in one resin material or the gain is so high that the control becomes unstable and oscillates.

The present invention is made to solve the problems described above with regard to the prior art and provides a screw backpressure controlling method in an electric injection molding machine that can achieve controlling accuracy comparable to the one in feedback control with simpler configuration, even though it is not the feedback control method but an ON-OFF control method.

Thus, according to claim 1 of the present invention, there is provided a screw backpressure controlling method in an electric injection molding machine comprising: a sensor for detecting a screw backpressure as an electric signal; servo motors for driving a screw forward and backward; a motor for rotating the screw to plasticize a material; and a controller for controlling said servo motors and said motor, wherein, in a plasticizing process in which said motor is rotated, said controller performs control by repeating a first process in which the rotation of said servo motors is controlled by a first retreating speed command value to make the screw retreat at a low speed when a screw backpressure signal is smaller than a backpressure set value and a second process in which the rotation of said servo motors is controlled by a second retreating speed command value to make the screw retreat at a high speed when the screw backpressure signal is larger than the backpressure set value.

According to one embodiment of the present invention, in the screw backpressure controlling method in the electric injection molding machine when said first process continues longer than a predetermined monitoring time, the first process is performed according to a first computed value that is obtained by subtracting an additional speed command value from said first retreating speed command value and the second process is performed according to a second computed value that is obtained by adding a speed difference to said first computed value, wherein the speed difference is, in turn, obtained by subtracting said first retreating speed command value from said second retreating speed command value.

According to one embodiment of the present invention, in the screw backpressure controlling method in the electric injection molding machine when said second process continues longer than a predetermined monitoring time, the second process is performed according to a first computed value that is obtained by adding an additional speed command value to said second retreating speed command value and the first process is performed according to a second computed value that is obtained by subtracting a speed difference from said first computed value, wherein the speed difference is, in turn, obtained by subtracting said first retreating speed command value from said second retreating speed command value.

According to one embodiment one embodiment of the present invention, in the screw backpressure controlling method in the electric injection molding machine, the retreating speed command value is switched from said first process to said second process or from said second process to said first process according to a predetermined temporal variation.

According to one embodiment of the present invention, in the screw backpressure controlling method in the electric injection molding machine, said monitoring time is changed according to how much said screw backpressure signal is deviated from said backpressure set value.

According to one embodiment of the present invention, in the screw backpressure controlling method in the electric injection molding machine, the monitoring time when said screw backpressure signal is deviated from said backpressure set value significantly is set to be shorter than the one when said screw backpressure signal is deviated slightly from said backpressure set value.

BRIEF DESCRIPTION OF THE DRAWINGS

FIG. 1 is a transverse cross sectional view schematically showing an injection device in an injection molding machine according to an embodiment of the present invention with a block diagram of a controller for controlling a screw backpressure;

FIG. 3 is an operational diagram for describing a control configuration when a screw backpressure signal is deviated downward from a backpressure set value;

DESCRIPTION OF THE PREFERRED EMBODIMENTS

An embodiment of the present invention will be described in detail with reference to the drawings.

Figure 2:
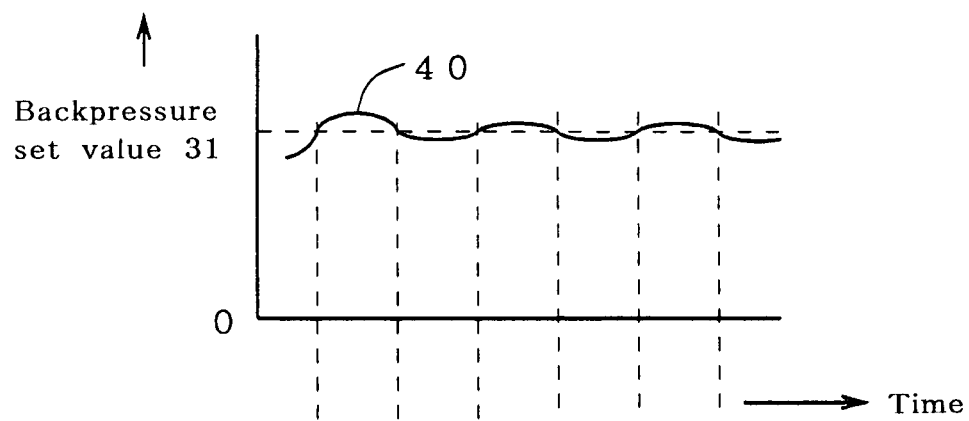
FIG. 2 is an operational diagram for describing a control configuration of the screw backpressure.
Figure 2:
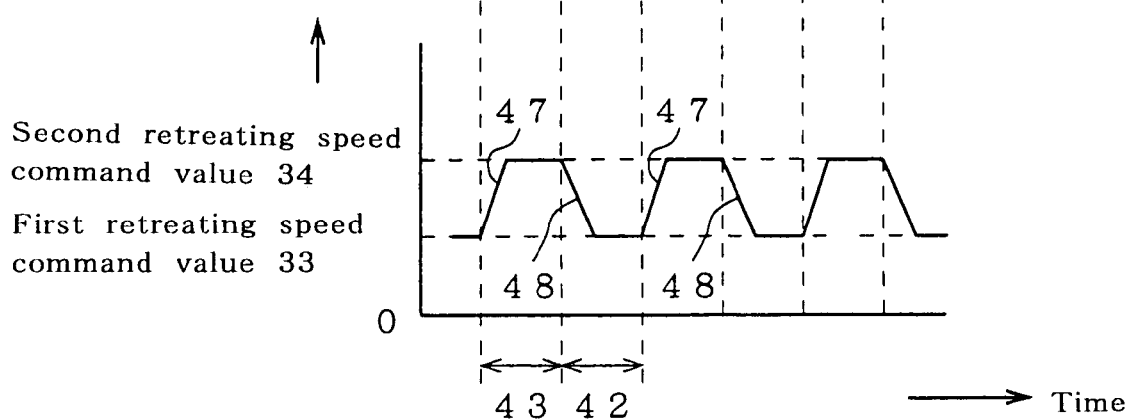
Figure 4:
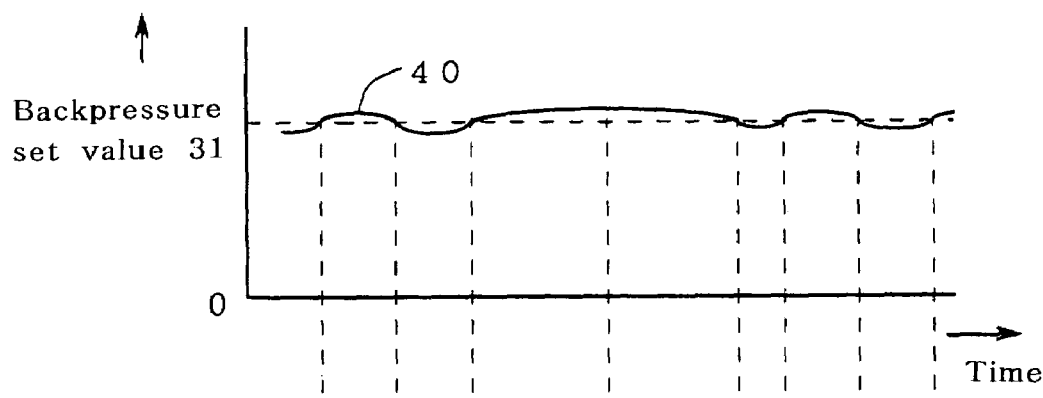
FIG. 4 is an operational diagram for describing a control configuration when the screw backpressure signal is deviated upward from the backpressure set value.
Figure 4:
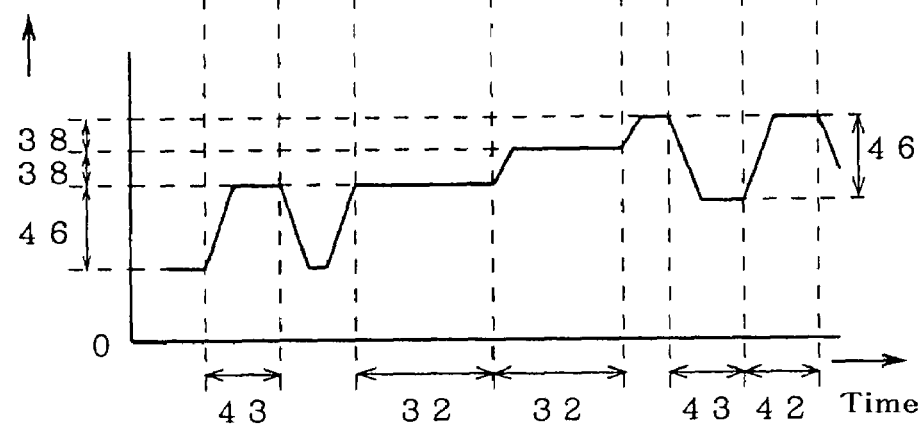
Figure 5:
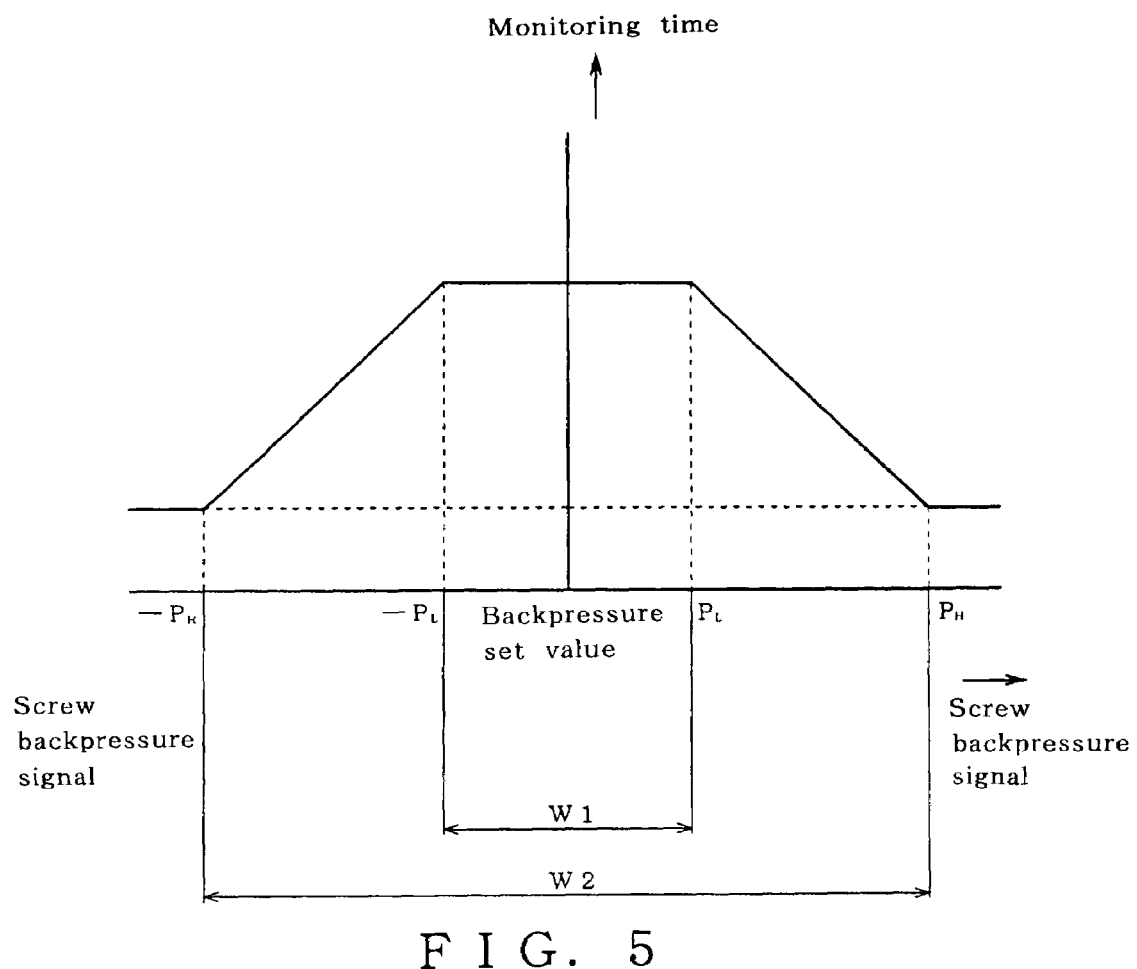
FIG. 5 is an explanatory diagram showing change of a monitoring time period with respect to the screw backpressure signal.
Figure 6:
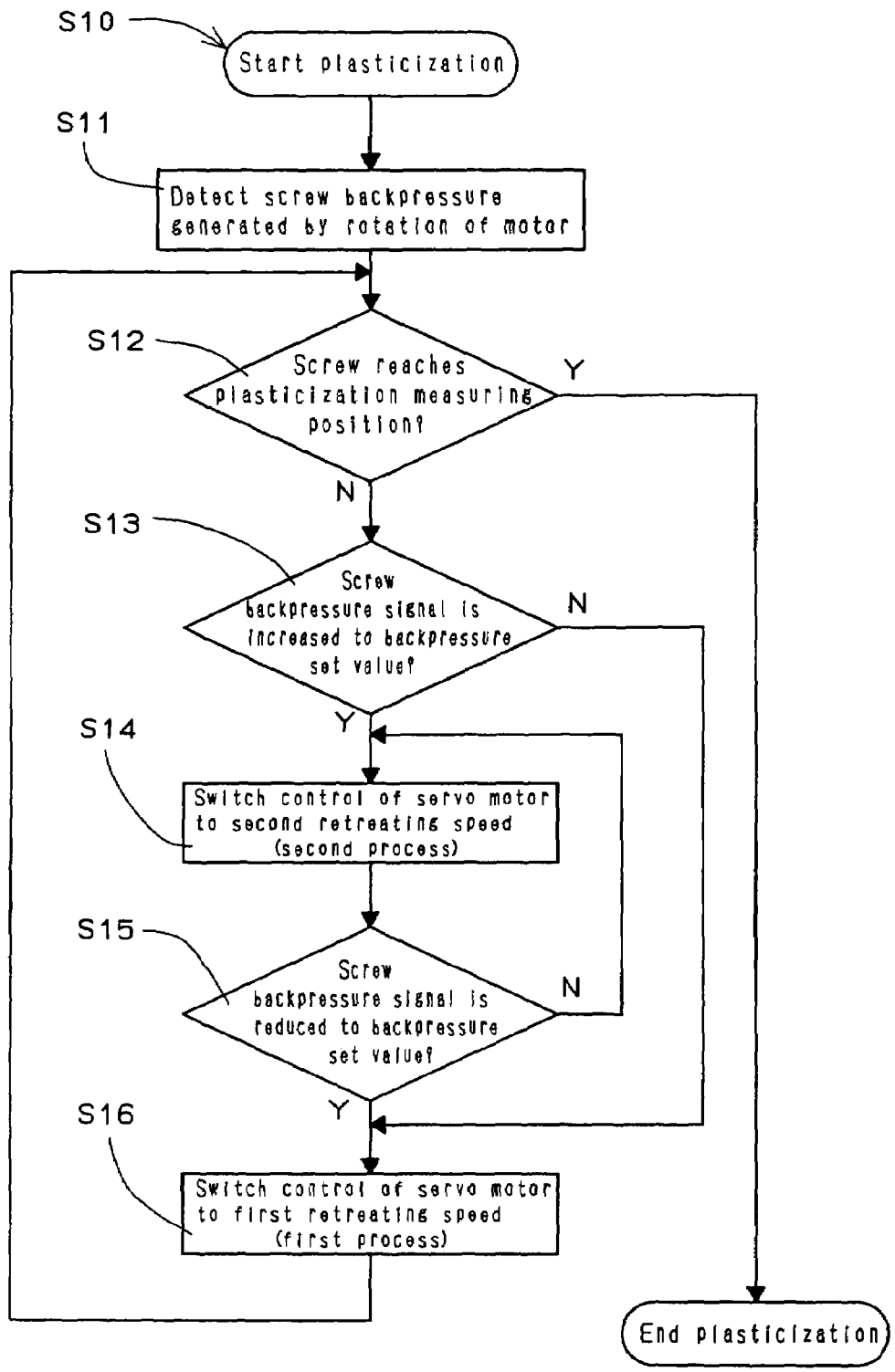
FIG. 6 is a flow chart for describing a control configuration of the screw backpressure.
Figure 7:
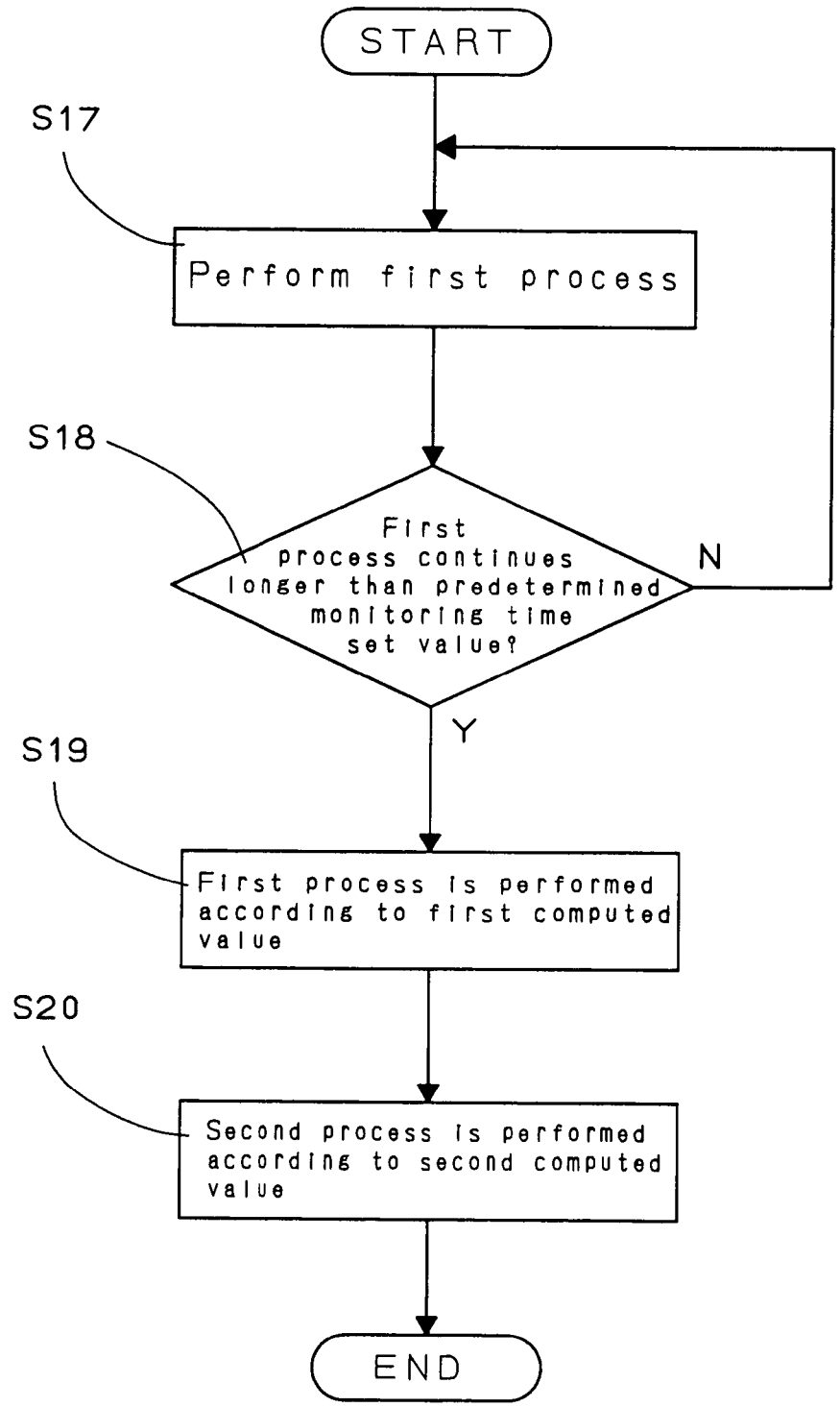
FIG. 7 is a flow chart for describing a control configuration when the screw backpressure signal is deviated downward from the backpressure set value.
Figure 8:
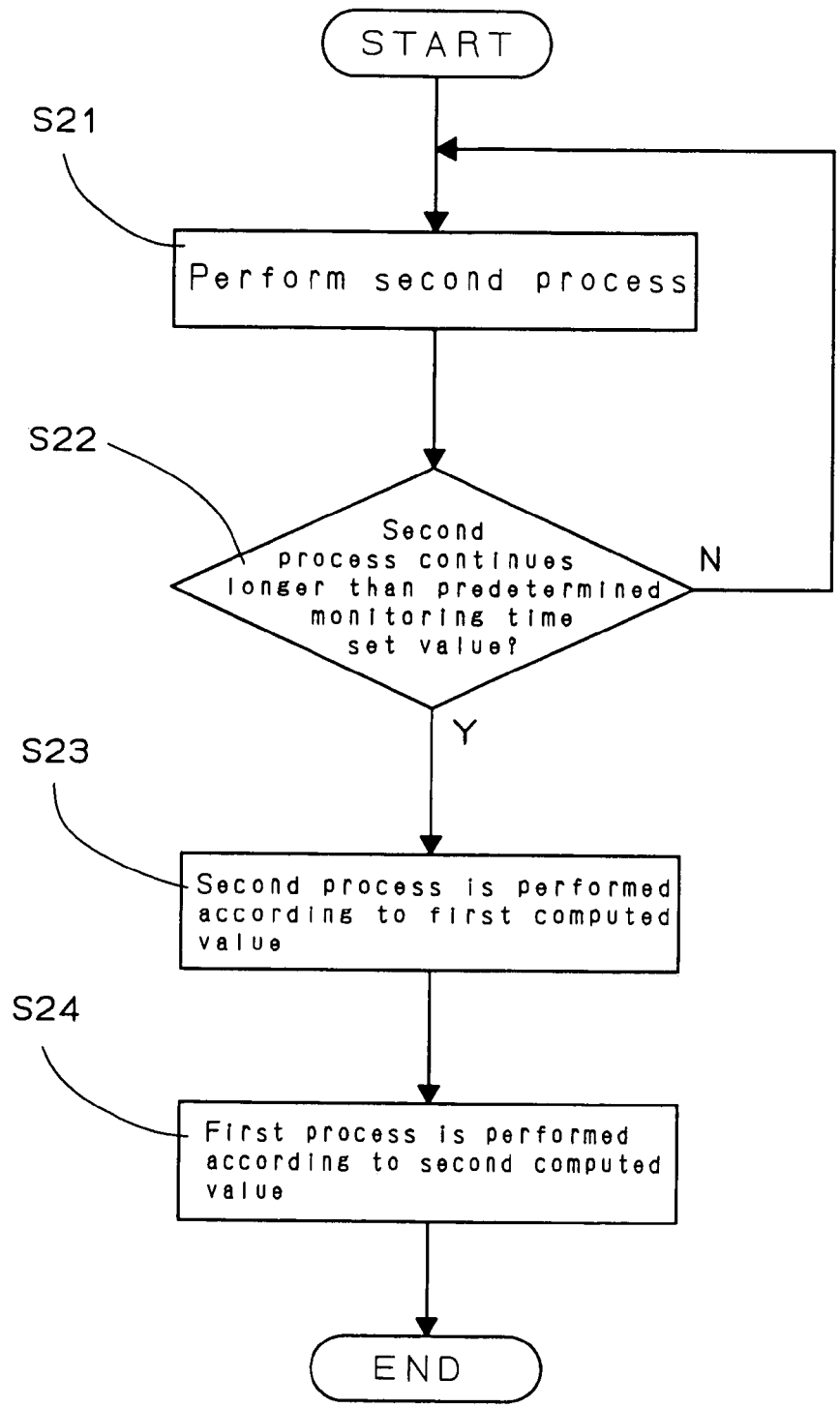
FIG. 8 is a flow chart for describing a control configuration when the screw backpressure signal is deviated upward from the backpressure set value.

FIG. 1 is a transverse cross sectional view schematically showing an injection device in an injection molding machine according to an embodiment of the present invention with a block diagram of a controller for controlling a screw backpressure; FIG. 2 is an operational diagram for describing a control configuration of the screw backpressure; FIG. 3 is an operational diagram for describing a control configuration when a screw backpressure signal is deviated downward from a backpressure set value; FIG. 4 is an operational diagram for describing a control configuration when the screw backpressure signal is deviated upward from the backpressure set value; FIG. 5 is an explanatory diagram showing change of a monitoring time period with respect to the screw backpressure signal; FIG. 6 is a flow chart for describing a control configuration of the screw backpressure; FIG. 7 is a flow chart for describing a control configuration when the screw backpressure signal is deviated downward from the backpressure set value; and FIG. 8 is a flow chart for describing a control configuration when the screw backpressure signal is deviated upward from the backpressure set value.

An injection device 10 in an injection molding machine in which the present invention is implemented is an electric injection device used for injection molding of thermoplastic or thermosetting resins in which a melted resin material 14 is injected and filled into a die (not shown) by advancing a screw 13 by servo motors 15 and 15 and a raw resin is plasticized, mixed and melted by rotating the screw 13 by a motor 23.

The screw 13 is fittingly inserted into a heating cylinder 12 in a rotatable and reciprocating manner and cooperates with the heating cylinder 12 that is provided with heating means such as a band heater to plasticize, mix and melt the raw resin so that the raw resin turns into the melted resin material 14. Then, the melted resin material 14 is injected and filled into the die (not shown) via a nozzle 11 by the screw 13 that moves forward as a plunger. The heating cylinder 12 is fixed to a housing 16 by a nut 17 and the screw 13 is fixed to a shaft 22. The shaft 22 is attached to a connecting board 20 rotatably via a bearing 27. Ball nuts 19 and 19 fixed to both ends of the connecting board 20 are screwed on respective ball screws 18 and 18 and each ball screw 18 is connected to a rotor of the servo motor 15 fixed to the housing 16. Inside a tubular portion of the connecting board 20 in which the shaft 22 is disposed, a load cell 21 is attached as a sensor for detecting the pressure of the melted resin material 14 applied to the screw 13 and, to the end of the tubular portion, the motor 23 for rotatably driving the screw 13 and its rotor is connected to the shaft 22. The motor 23 is preferably a servo motor but it may be an induction or other motor.

A controller 30 is constituted by a microprocessor and controls an operational sequence and the speed, force, position, temperature and so on of an actuator in the injection molding machine comprising the injection device 10, a die clamping device (not shown) and other elements. FIG. 1 functionally shows only a part of the controller that is related to the present invention. Each of a backpressure set value 31, a monitoring time set value 32, a first retreating speed command value 33 and a second retreating speed command value 34 is either set individually or computed by a CPU based on the backpressure set value 31 set in a manipulating section of the controller 30 and, then, stored in a RAM or ROM. Further, as described below, the second retreating speed command value 34 may alternatively be determined from an actual measured value of a screw retreating speed. Here, it is to be noted that the manipulating section, the CPU, the RAM and the ROM are in a known configuration and, therefore, their illustration and description is omitted.

A screw backpressure signal 40 from the load cell 21 is input to a comparing section 35, along with the backpressure set value 31 and the monitoring time set value 32. The comparing section 35 compares these values and outputs a switching signal as a result of the comparison to switching means 36. The first retreating speed command value 33, the second speed command value 34, and a value that is a result of adding/subtracting an additional speed command value 38 to/from the first retreating speed command value 33 and the second speed command value 34 are input to the switching means 36. According to the switching signal from the comparing section 35, the switching means 36 selects any one of said plurality of command values alternatively and outputs the selected value to a servo amplifier 37. The servo amplifier 37 is a known device for feedback controlling the servo motors 15 and 15. To this servo amplifier 37, along with the retreating speed command value selected by the switching means 36, position signals are input from encoders 24 and 24 attached to drive shafts of the servo motors 15 and 15. In this connection, it is to be noted that two servo motors 15 are provided in this embodiment and two servo amplifiers 37 may be provided for supplying currents to the servo motors 15 and 15 so that both servo motors can be operated in synchronization. Further, the injection device may be provided with one servo motor 15.

Next, the operation will be described with reference to FIGS. 2 and 8. Said injection device 10 is advanced so that the nozzle 11 abuts on the die (not shown) and, then, said motor 23 is activated to rotate the screw 13. Thus, plasticization of the resin material as shown in FIG. 6 is started (S10). The resin material is melted and mixed by the screw 13 that rotates in the heating cylinder 12 to turn into the melted resin material 14 and, then, the melted resin material 14 is accumulated forward of the screw 13 in the heating cylinder 12. The nozzle 11 abuts on the die (not shown) while a tip opening of the nozzle 11 is blocked by the resin that has been injected in the preceding molding. Therefore, a force in the retreating direction is generated by a reaction force based on the pressure of the accumulated melted resin material 14 and is applied to the rotating screw 13 and the force is detected by the load cell 21 as a screw backpressure signal 40 (S11). The position of the screw 13 that moves backward by said force in the retreating direction is detected by the encoder 24 of the servo motor 15 or a position sensor provided separately. The position of the screw 13 is compared with a plasticization measurement position that is preliminarily determined based on a volume of a molded product and it is determined whether the screw reaches the plasticization measurement position or not (S12). In this step S12, if it is determined that said screw 13 reaches the plasticization measurement positions, the rotation of the motor 23 is stopped and the plasticization is finished. On the other hand, if it is determined that the screw 13 has not reached the plasticization measurement position in said step S12, the retreating speed of the screw 13 is controlled by ON-OFF control according to the present invention so that the screw backpressure signal 40 approximates to the backpressure set value 31.

In the plasticization process, said comparing section 35 compares the screw backpressure signal 40 with the backpressure set value 31 to determine whether the screw backpressure signal 40 is increased up to the backpressure set value 31 or not (S13). In this step S13, if the screw backpressure signal 40 is not increased up to the backpressure set value 31 or, in other words, if said screw backpressure signal 40 is smaller than the backpressure set value 31, the operation jumps to S16, where a first process 42 for controlling the rotation of said servo motors 15 and 15 according to the first retreating speed command value 33 that allows the screw 13 to retreat at a slow speed as described above. On the other hand, in said step S13, if said screw backpressure signal 40 is increased up to the backpressure set value 31, or, in other words, if said screw backpressure signal 40 is larger than the backpressure set value 31, the comparing section 35 transmits the switching signal to the switching means 36 to switch a connection terminal 53 to a connection terminal 54. Thus, the control of said servo motors 15 and 15 is switched into the speed control based on the second retreating speed command value 34 that allows the screw 13 to retreat at a high speed (S14). Then, a second process 43 is performed in which the rotation of said servo motors 15 and 15 is controlled by said second retreating speed command value 34 via the servo amplifier 37.

By increasing the retreating speed of the screw 13, the pressure of the melted resin material 14 or the screw backpressure signal 40 is reduced. Next, in S15, said comparing section 35 compares the screw backpressure signal 40 with the backpressure set value 31 to determine whether the screw backpressure signal 40 is reduced to the backpressure set value 31 or not (S15). In this step S15, if the screw backpressure signal 40 is not reduced to the backpressure set value 31, the operation returns to S14 to continue said second process 43. On the other hand, if the screw backpressure signal 40 is reduced to the backpressure set value 31 in said step S15, the comparing section 35 transmits the switching signal to the switching means 36 to switch the connection terminal 54 to the connection terminal 53. It switches the control of said servo motors 15 and 15 into the speed control based on the first retreating speed command value 33 that allows the screw 13 to retreat at a low speed (S16). Then, the first process 42 is performed in which the rotation of said servo motors 15 and 15 is controlled by said first retreating speed command value 33 via the servo amplifier 37. Then, the operation returns to said S2 and, then, said first process 42 and said second process 43 are repeated alternately till the screw 13 reaches the plasticization measurement position so that the screw backpressure signal 40 approximates to the backpressure set value 31.

As described above, the control of the screw backpressure signal 40 is an ON-OFF control and, as shown in FIG. 2, said screw backpressure signal 40 oscillates around said backpressure set value 31. Further, because said screw backpressure signal 40 is not feedback controlled, said screw backpressure signal 40 is susceptible to controlling disturbances such as rotational load variation of the screw 13 when the resin material is plasticized. Therefore, when the screw backpressure signal 40 is deviated from the backpressure set value 31, the control is performed so that the screw backpressure signal 40 approximates to the backpressure set value 31.

First, the control when the screw backpressure signal 40 is deviated downward from the backpressure set value 31 will be described with reference to FIGS. 3 and 7. In the plasticizing process, while said first process is performed (S17), the controller 30 determines whether the screw backpressure signal 40 is deviated downward from the backpressure set value 31 and the first process continues longer than the predetermined monitoring time set value 32 or not (S18). In this step S18, if the first process does not continue longer than the predetermined monitoring time set value 32, the operation returns to said S17 to continue the first process. On the other hand, if the first process continues longer than the predetermined monitoring time set value 32 in said S18, the first process is performed according to a first computed value that is obtained by subtracting the additional speed command value 38 from said first retreating speed command value 33 (S19) and the second process is performed according to a second computed value that is obtained by adding a speed difference 46 to said first computed value, wherein the speed difference 46 is, in turn, obtained by subtracting said first retreating speed command value 33 from said second retreating speed command value 34 (S20). Thus, as shown in FIG. 1, the switching means 36 performs the control by switching between the connection terminal 51 and the connection terminal 52 alternately. Here, in the first process in said S19, the first computed value is considered as the first retreating speed command value 33 and the first process performs determination similar to the one in said S18 at this time and, as shown in FIG. 3, the process of S19 may be performed successively. Therefore, the number of addition of the additional speed command value 38 is controlled according to how much the screw backpressure signal 40 is deviated downward from the backpressure set value 31 so that the deviation of the screw backpressure signal 40 downward from the backpressure set value 31 can be corrected. Further, said first computed value and said second computed value are stored in the RAM that is a temporary storage device of the controller 30 to be used in computation by the CPU.

Next, the control when the screw backpressure signal 40 is deviated upward from the backpressure set value 31 will be described with reference to FIGS. 4 and 8. In the plasticizing process, while said second process is performed (S21), the controller 30 determines whether the screw backpressure signal 40 is deviated upward from the backpressure set value 31 and the second process continues longer than the predetermined monitoring time set value 32 or not (S22). In this step S22, if the second process does not continue longer than the predetermined monitoring time set value 32, the operation returns to said S21 to continue the second process. On the other hand, if the second process continues longer than the predetermined monitoring time set value 32 in said S22, the second process is performed according to a first computed value that is obtained by adding the additional speed command value 38 to said second retreating speed command value 34 (S23) and the first process is performed according to a second computed value that is obtained by subtracting a speed difference from said first computed value, wherein the speed difference 46 is, in turn, obtained by subtracting said first retreating speed command value 33 from said second retreating speed command value 34 (S24). Thus, as shown in FIG. 1, the switching means 36 performs control by switching between the connection terminal 56 and the connection terminal 55 alternately. Here, in the second process in said S23, the first computed value is considered as the second retreating speed command value 34 and the second process performs determination similar to the one in said S22 at this time and, as shown in FIG. 4, the process of S23 may be performed successively. Therefore, the number of additions of the additional speed command value 38 is controlled according to how much the screw backpressure signal 40 is deviated upward from the backpressure set value 31 so that the deviation of the screw backpressure signal 40 upward from the backpressure set value 31 can be corrected. Further, said first computed value and said second computed value are stored in the RAM that is a temporary storage device of the controller 30 to be used in computation by the CPU.

In this connection, the switching means 36 switches between the first retreating speed command value 33 and the second retreating speed command value 34 instantaneously. However, such instantaneous switching of the command signal changes the retreating speed of the screw 13 abruptly. It makes the pressure of the melted resin material 14 or the screw backpressure signal 40 fluctuate abruptly so that said screw backpressure signal 40 oscillates above and below the screw backpressure set value 31. In order to prevent this problem, as shown by reference numerals 47 and 48 in FIG. 2, the switching from the first retreating speed command value 33 to the second retreating speed command value 34 or the switching from the second retreating speed command value 34 to the first retreating speed command value 33 is performed according to a predetermined temporal variation. Here, it is effective to perform said switching gradually with a time constant that represents the predetermined temporal variation. The value of said time constant may be changed appropriately depending on the material resin or the plasticizing conditions. Further, the switching from the first retreating speed command value 33 to the second retreating speed command value 34 or the switching from the second retreating speed command value 34 to the first retreating speed command value 33 may not be performed based on the time constant but may be based on a linear or any curvilinear temporal change. Still further, though an example in which the switching time constant 47 from the first retreating speed command value 33 to the second retreating speed command value 34 is equal to the switching time constant 48 from the second retreating speed command value 34 to the first retreating speed command value 33 is shown in FIG. 2, the two switching time constants 47 and 48 may be different from each other according to the plasticizing conditions. Still further, such control in which the set values are switched with time can also be applied to the case in which the screw backpressure signal 40 is deviated from the backpressure set value 31 as shown in FIGS. 3 and 4.

As another method for improving the control of the screw backpressure, correction control of said monitoring time set value 32 is provided. In this correction control, the monitoring time (the monitoring time set value 32) is changed according to how much the screw backpressure signal 40 is deviated from said backpressure set value 31. Here, the monitoring time (the monitoring time set value 32) when said screw backpressure signal 40 is deviated from said backpressure set value 31 significantly is set to be shorter than the one when said screw backpressure signal 40 is deviated from said backpressure set value 31 slightly. As shown in FIG. 5, a first monitoring range W1 between a first lower threshold value $-P_L$ and a first upper threshold value $P_L$ and a second monitoring range W2 between a second lower threshold value $-P_H$ and a second upper threshold value $P_H$ are defined. Then, with respect to the screw backpressure signal 40, between the first monitoring range W1 and second monitoring range W2, the monitoring time set value 32 is reduced on a proportional basis from the first monitoring range W1 toward the second monitoring range W2, then, within the first monitoring range W1, said monitoring time set value 32 is constant at a value predetermined for the monitoring range W1 and, then, out of the second monitoring range W2, said monitoring time set value 32 is constant at a value predetermined for the monitoring range W2. Further, this correction control may be alternatively configured so that the first monitoring range W1 is not provided but only the second monitoring range W2 is provided and, then, between said backpressure set value 31 and the second monitoring range W2, the monitoring time set value 32 is reduced on a proportional basis from said backpressure set value 31 toward the second monitoring range W2. Still further, the monitoring time set value 32 may be changed with respect to the screw backpressure signal 40 not on a proportional basis as described above but on an arbitrary curvilinear basis. In this case, between said first monitoring range W1 and said second monitoring range W2, said monitoring time (the monitoring time set value 32) is corrected so that it is reduced as said screw backpressure signal 40 is deviated from the backpressure set value 31. It gives a degree of freedom to said monitoring time when the deviation of the screw backpressure signal 40 from said backpressure set value 31 is corrected so as to improve the control of the screw backpressure.

Here, actual set values in an embodiment of the present invention will be illustrated. As for the retreating speed command values, when the backpressure set value 31 is set to a low value and the screw backpressure is low and when the rotational speed set value of the motor 23 is set to a high value and the rotational speed of the screw 13 is high, it is effective for improving the control of the screw backpressure to make said screw 13 retreat faster. Therefore, the second retreating speed command value 34 is determined based on the screw backpressure signal 40 that reflects the actual measured value of the screw backpressure control. More specifically, it is determined as follows. First, while the servo motors 15 and 15 are controlled so that their rotational speed is zero to prevent said screw 13 from retreating, the screw 13 is rotated to start plasticization of the resin material. Then, the retreating speed of the screw 13 when the screw backpressure signal 40 is increased up to the backpressure set value 31 is detected. The detected retreating speed is stored in the temporary storage device RAM of the controller 30 as the second retreating speed set value 34. Said speed difference 46 is set to 2 mm per second, for example, and, based on this value, said CPU calculates the first retreating speed set value 33.

Besides the above, the additional speed set value 38 is set to 0.1 mm/sec, the monitoring time set value 32 is set to 1–2 msec, the first monitoring range W1 is set to ±1 MPa, the second monitoring range W2 is set to ±5 MPa, and the time constant is set to 2 msec.

The present invention is not limited to the embodiments described above and various variations can be made without departing from the sprit of the invention.

As illustrated and described above, according to an embodiment of the present invention, there is provided the screw backpressure controlling method in an electric injection molding machine for performing control by repeating the first process in which the rotation of said servo motors is controlled by the first retreating speed command value to make the screw retreat at a low speed when the screw backpressure signal is smaller than the backpressure set value and the second process in which the rotation of said servo motors is controlled by the second retreating speed command value to make the screw retreat at a high speed when the screw backpressure signal is larger than the backpressure set value. In this controlling method, even though it is not the feedback control method but it is an ON-OFF control method, a level of controlling accuracy comparable to the feedback control can be obtained stably with a simpler configuration.

According to another embodiment of the present invention, there is provided the screw backpressure controlling method in the electric injection molding machine wherein, when said first process continues longer than the predetermined monitoring time, the first process is performed according to the first computed value that is obtained by subtracting the additional speed command value from said first retreating speed command value and the second process is performed according to the second computed value that is obtained by adding the speed difference to said first computed value, wherein the speed difference is, in turn, obtained by subtracting said first retreating speed command value from said second retreating speed command value. In this controlling method, the number of additions of the additional speed command value can be controlled according to how much the screw backpressure signal is deviated downward from the backpressure set value and, therefore, the downward deviation of said screw backpressure signal from said backpressure set value can be corrected.

According to yet another embodiment of the present invention, there is provided the screw backpressure controlling method in the electric injection molding machine wherein, when said second process continued longer than the predetermined monitoring time, the second process is performed according to the first computed value that is obtained by adding the additional speed command value to said second retreating speed command value and the first process is performed according to the second computed value that is obtained by subtracting the speed difference from said first computed value, wherein the speed difference is, in turn, obtained by subtracting said first retreating speed command value from said second retreating speed command value. In this controlling method, the number of additions of the additional speed command value can be controlled according to how much the screw backpressure signal is deviated upward from the backpressure set value and, therefore, the upward deviation of said screw backpressure signal from the backpressure set value can be corrected.

According to yet another embodiment of the present invention, there is provided the screw backpressure controlling method in the electric injection molding machine wherein the retreating speed command value is switched from said first process to said second process or from said second process to said first process according to the predetermined temporal variation. In this controlling method, the control of the screw backpressure signal can be improved by eliminating undershoot or overshoot.

According to yet another embodiment of the present invention, there is provided the screw backpressure controlling method in the electric injection molding machine wherein said monitoring time is changed according to how much said screw backpressure signal is deviated from said backpressure set value. In this controlling method, the deviation of the screw backpressure signal from said backpressure set value can be corrected and the control of the screw backpressure can be improved.

According to yet another embodiment of the present invention, there is provided the screw backpressure controlling method in the electric injection molding machine wherein the monitoring time when said screw backpressure signal is deviated from said backpressure set value significantly is set to be shorter than the one when said screw backpressure signal is deviated from said backpressure set value slightly. In this controlling method, the deviation of the screw backpressure signal from said backpressure set value can be corrected with a degree of freedom of said monitoring time so as to improve the control of the screw backpressure.

What is claimed is:

1. A screw backpressure controlling method in an electric injection molding machine comprising:
   a sensor for detecting a screw backpressure as an electric signal;
   a servo motor for driving a screw forward and backward;
   a motor for rotating the screw to plasticize a material; and
   a controller for controlling said servo motor and said motor, wherein, in a plasticizing process in which said motor is rotated, said controller performs control by repeating a first process in which the rotation of said servo motor is controlled by a first retreating speed command value to make the screw retreat at a low speed when a screw backpressure signal is smaller than a backpressure set value and a second process in which the rotation of said servo motor is controlled by a second retreating speed command value to make the screw retreat at a high speed when the screw backpressure signal is larger than the backpressure set value;
   wherein, when said first process continues longer than a predetermined monitoring time, the first process is performed according to a first computed value that is obtained by subtracting an additional speed command value from said first retreating speed command value and the second process is performed according to a second computed value that is obtained by adding a speed difference to said first computed value, wherein the speed difference is, in turn, obtained by subtracting said first retreating speed command value from said second retreating speed command value.

2. A screw backpressure controlling method in an electric injection molding machine according to claim 1, wherein, when said second process continues longer than a predetermined monitoring time, the second process is performed according to a first computed value that is obtained by adding the additional speed command value to said second retreating speed command value and the first process is performed according to a second computed value that is obtained by subtracting a speed difference from said first computed value, wherein the speed difference is, in turn, obtained by subtracting said first retreating speed command value from said second retreating speed command value.

3. A screw backpressure controlling method in an electric injection molding machine according to claim 1, wherein, the retreating speed command value is switched from said first process to said second process or from said second process to said first process according to a predetermined temporal variation.

4. A screw backpressure controlling method in an electric injection molding machine according to claim 1, wherein, said monitoring time is changed according to how much said screw backpressure signal is deviated from said backpressure set value.

5. A screw backpressure controlling method in an electric injection molding machine according to claim 4, wherein the monitoring time when said screw backpressure signal is deviated from said backpressure set value significantly is set to be shorter than the one when said screw backpressure signal is slightly deviated from said backpressure set value.

6. A screw backpressure controlling method in an electric injection molding machine comprising:
- a sensor for detecting a screw backpressure as an electric signal;
- a servo motor for driving a screw forward and backward;
- a motor for rotating the screw to plasticize a material; and
- a controller for controlling said servo motor and said motor, wherein, in a plasticizing process in which said motor is rotated, said controller performs control by repeating a first process in which the rotation of said servo motor is controlled by a first retreating speed command value to make the screw retreat at a low speed when a screw backpressure signal is smaller than a backpressure set value and a second process in which the rotation of said servo motor is controlled by a second retreating speed command value to make the screw retreat at a high speed when the screw backpressure signal is larger than the backpressure set value;

wherein, when said second process continues longer than a predetermined monitoring time, the second process is performed according to a first computed value that is obtained by adding the additional speed command value to said second retreating speed command value and the first process is performed according to a second computed value that is obtained by subtracting a speed difference from said first computed value, wherein the speed difference is, in turn, obtained by subtracting said first retreating speed command value from said second retreating speed command value.

7. A screw backpressure controlling method in an electric injection molding machine according to claim 6, wherein, the retreating speed command value is switched from said first process to said second process or from said second process to said first process according to a predetermined temporal variation.

8. A screw backpressure controlling method in an electric injection molding machine according to claim 6, wherein, said monitoring time is changed according to how much said screw backpressure signal is deviated from said backpressure set value.

9. A screw backpressure controlling method in an electric injection molding machine according to claim 8, wherein the monitoring time when said screw backpressure signal is deviated from said backpressure set value significantly is set to be shorter than the one when said screw backpressure signal is slightly deviated from said backpressure set value.

* * * * *